United States Patent
Lee et al.

(10) Patent No.: US 8,639,687 B2
(45) Date of Patent: Jan. 28, 2014

(54) USER-CUSTOMIZED CONTENT PROVIDING DEVICE, METHOD AND RECORDED MEDIUM

(75) Inventors: Seunghwa Lee, Seoul (KR); Minchul Jung, Seoul (KR); Eunseok Lee, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 957 days.

(21) Appl. No.: 12/040,746

(22) Filed: Feb. 29, 2008

(65) Prior Publication Data

US 2009/0019033 A1 Jan. 15, 2009

(30) Foreign Application Priority Data

Jul. 11, 2007 (KR) .................. 10-2007-0069829

(51) Int. Cl.
*G06F 7/00* (2006.01)
(52) U.S. Cl.
USPC .................. 707/723; 707/732; 707/734
(58) Field of Classification Search
USPC .................. 707/721, 751, 768, 1, 2, 3, 4, 5, 707/999.001, 999.002, 999.003, 999.004, 707/999.005, 723
See application file for complete search history.

(56) References Cited

U.S. PATENT DOCUMENTS

| | | | |
|---|---|---|---|
| 7,440,968 B1 * | 10/2008 | Oztekin et al. .................. 1/1 |
| 2006/0136378 A1 * | 6/2006 | Martin .................. 707/3 |
| 2006/0253421 A1 * | 11/2006 | Chen et al. .................. 707/2 |
| 2008/0114751 A1 * | 5/2008 | Cramer et al. .................. 707/5 |
| 2008/0301113 A1 * | 12/2008 | Chi et al. .................. 707/5 |
| 2009/0089278 A1 * | 4/2009 | Poola et al. .................. 707/5 |

FOREIGN PATENT DOCUMENTS

| | | |
|---|---|---|
| KR | 10-2005-0095230 | 9/2005 |
| KR | 10-2007-0020062 | 2/2007 |
| KR | 10-2007-0038146 | 4/2007 |

OTHER PUBLICATIONS

Korean Office action for Korean Patent Application 10-2007-0069829.

* cited by examiner

*Primary Examiner* — Amy Ng
(74) *Attorney, Agent, or Firm* — James P. Muraff; Neal, Gerber & Eisenberg LLP

(57) ABSTRACT

Disclosed are a user-customized content providing device, a method and a recorded medium. In accordance with an embodiment of the present invention, the user-customized content providing device can include a content searching unit, searching a content set related to user's search query word; a user preference information requesting unit, asking an apparatus for user preference information including a user profile and tag information through a network, the user profile including a keyword collected in the apparatus and a point applied with a weight given per keyword; a user preference information collecting unit, receiving the user preference information from the apparatus; a content ranking determining unit, determining a ranking of the content set according to the relation to the user preference information; and a content providing unit, providing the ranked content set to the apparatus.

17 Claims, 9 Drawing Sheets

FIG. 3

```
<ahref="/2007/TECH/space/02/28/space.station.debris.reut/index.html">
Report weighs space station risks</a>

<ahref="/2007TECH/space/02/27/space.shuttle/index.html>Hail damage postpones shuttle launch</a>

<ahref="/2007/WORLD/asiapict/02/27/chin.pigeon.reut/index.html>
Scientists command pigeons via remote control</a>

<ahref="/2007/TECH/02/27/enviornmenta.ringtones.ap/index.html">
Activists howl, chirp and croak over ringtones</a>
```

FIG. 4

| Doc_id | URL | hyperlink_title |
|---|---|---|
| 1 | http://edition.cnn.com/2007/TECH/space/02/28/space.station.debris.reut/index.html | Report weighs space station risks |
| 2 | http://edition.cnn.com/2007/TECH/space/02/27/space.shuttle/index.html | Hail damage postpones shuttle launch |
| 3 | http://edition.cnn.com2007/WORLD/asiapict/02/27/china.pigeon.reut/index.html | Scientists command pigeons via remote control |

| Rankings | Keyword | Frequency | Point |
|---|---|---|---|
| 1 | Scientists | 14 | 50 |
| 2 | Hal | 10 | 42 |
| 3 | report | 8 | 28 |
| ⋮ | ⋮ | ⋮ | ⋮ |
| 50 | Safe | 2 | -4 |

USER-CUSTOMIZED CONTENT PROVIDING DEVICE, METHOD AND RECORDED MEDIUM

CROSS-REFERENCE TO RELATED PATENT APPLICATIONS

This application claims the benefit of Korean Patent Application No. 10-2007-0069829, filed on Jul. 11, 2007, in the Korean Intellectual Property Office, the disclosure of which is incorporated herein in its entirety by reference.

BACKGROUND OF THE INVENTION

1. Field of the Invention

The present invention relates to a user-customized content providing device, a method thereof and a recorded medium thereof, more specifically to the technology capable of user-customized contents according to personalized user preference information by using tag information.

2. Background Art

Today's prompt development of the information communication technologies has increased the use of Internet every day, and the amount of information on Internet has gradually swelled. However, very little information is actually useful for a user. This makes it very important to provide a user with the information that is customized to meet the user's demand.

Especially, it is necessarily required to suggest merchandise (or information) based on user preference information in order to activate commercial transaction and to improve the satisfaction and loyalty of the information provider (or web-shop) in an electronic commerce field. For this, one of the most important factors is to quickly and accurately analyze user preference.

Accordingly, various methods for analyzing user's interests have been studied. The most typical one of the methods provides customized information (e.g. web contents) based on the preference information which is evincively represented by a user when the user firstly visits a website. However, this method may be troublesome to the user, and it may be difficult to acquire the preference of the user who dynamically changes.

To solve the above problem, the methods of implicitly studying the preference through user's action have been developed. The well-known method analyzes all contents of the web document linked to the hyperlink selected by a user to study the preference of the user through the frequency of words used in the web document.

However, in accordance with the conventional art, it takes a lot of times to analyze all words included in connected web documents. The web documents also include unnecessary various types of information that may drop the accuracy of analysis of user's interests. Actually, lots of web documents repeatedly shows movement buttons in websites and unnecessary information such as advertisement, company profile and copyright information. Since the web programming method maintaining a certain template and dynamically generating internal contents has been recently used, unnecessary contents are repeatedly included in the web documents much more.

Conventionally, the user preference information is separately managed by each web-server. If this user preference information can be unified and managed by user's apparatus and each server can ask the apparatus for the unified and managed user preference information as necessary, the shops dealing in similar merchandises is possible to usefully access information, which a user are interested in, at other shop websites.

SUMMARY OF THE INVENTION

Accordingly, the present invention, which is contrived to solve the aforementioned problems, provides user-customized contents by applying user preference information collected in user's apparatus to personalized information.

The present invention provides a method of providing a personalized service by each web server without previously stored user information by allowing the web servers asking for information collected in user's apparatus.

The present invention provides user-customized contents by using user preference information that can be quickly and accurately analyzed by use of an anchor tag and/or a form tag information.

An aspect of the present invention features a user-customized content providing device including a content searching unit, searching a content set related to user's search query word; a user preference information requesting unit, asking an apparatus for user preference information including a user profile and tag information through a network, the user profile including a keyword collected in the apparatus and a point applied with a weight given per keyword; a user preference information collecting unit, receiving the user preference information from the apparatus; a content ranking determining unit, determining a ranking of the content set according to the relation to the user preference information; and a content providing unit, providing the ranked content set to the apparatus.

Also, the keyword can be detected by using tag information extracted from at least one tag of an anchor tag, a form tag and a combination thereof that are included in a web document outputted to the apparatus.

The tag information can include anchor tag information including an anchor text and an URL connected to the anchor text; and form tag information including a query word and an URL connected to the query word.

The keyword can be detected by excluding a stop word from words included in a mapping table and query words, all parts or some parts of tag information included in the web document being written in the mapping table.

The weight can be added according to an increased frequency in use of the keyword.

The weight can be subtracted for the keyword that is not selected by a user although the keyword is included in the mapping table or the user profile.

The keywords included in the user profile can be ranked according to a point in accordance with the weight.

Keywords included in the user profile can be limited to the Nth ranking, N being a natural number.

The device can further include a query word receiving unit, receiving the search query word from the apparatus.

Another aspect of the present invention features a user-customized content providing device including a content searching unit, searching a content set related to user's search query word; a user preference information requesting unit, asking an apparatus for user preference information including tag information extracted from at least one tag of an anchor tag, a form tag and a combination thereof through a network; a user preference information collecting unit, receiving the user preference information from the apparatus; a user profile generating unit, generating a user profile by using the user preference information, the user profile including a keyword and a point applied with a weight given per keyword; a content ranking determining unit, determining a ranking of the content set according to the relation to the user preference information including the user profile; and a content providing unit, providing the ranked content set to the apparatus.

Also, the keyword can be detected by using tag information extracted from at least one tag of an anchor tag, a form tag and a combination thereof that are included in a web document outputted to the apparatus.

Another aspect of the present invention features user-customized content providing method including searching a content set related to user's search query word; asking an apparatus for user preference information including a user profile and tag information, the user profile including a keyword collected in the apparatus and a point applied with a weight given per keyword; receiving the user preference information from the apparatus; determining a ranking of the content set according to the relation to the user preference information; and providing the ranked content set to the apparatus.

Also, the keyword can be detected by using tag information extracted from at least one tag of an anchor tag, a form tag and a combination thereof that are included in a web document outputted to the apparatus.

The tag information can include anchor tag information including an anchor text and an URL connected to the anchor text; and form tag information including a query word and an URL connected to the query word.

The keyword can be detected by extracting a stop word from and words included in a mapping table and query words, all parts or some parts of tag information included in the web document being written in the mapping table.

The weight can be added according to an increased frequency in use of the keyword.

The weight can be subtracted for the keyword that is not selected by a user although the keyword is included in the mapping table or the user profile.

The keywords included in the user profile can be ranked according to a point in accordance with the weight.

Keywords included in the user profile can be limited to the $N^{th}$ ranking, N being a natural number.

Another aspect of the present invention features a user-customized content providing method including searching a content set related to user's search query word; asking an apparatus for user preference information including tag information extracted from at least one tag of an anchor tag, a form tag and a combination thereof through a network; receiving the user preference information from the apparatus; generating a user profile by using the user preference information, the user profile including a keyword and a point applied with a weight given per keyword; determining a ranking of the content set according to the relation to the user preference information including the user profile; and providing the ranked content set to the apparatus.

Also, the keyword can be detected by using tag information extracted from at least one tag of an anchor tag, a form tag and a combination thereof that are included in a web document outputted to the apparatus.

Another aspect of the present invention features recorded medium tangibly embodying a program of instructions executable by a device to providing user-customized contents, the recorded medium being readable by the device. The program can include searching a content set related to user's search query word; asking an apparatus for user preference information including a user profile and tag information, the user profile including a keyword collected in the apparatus and a point applied with a weight given per keyword; receiving the user preference information from the apparatus; determining a ranking of the content set according to the relation to the user preference information; and providing the ranked content set to the apparatus Another aspect of the present invention features a recorded medium tangibly embodying a program of instructions executable by a device to providing user-customized contents, the recorded medium being readable by the device. The program can include searching a content set related to user's search query word; asking for an apparatus user preference information including tag information extracted from at least one tag of an anchor tag, a form tag and a combination thereof through a network; receiving the user preference information from the apparatus; generating a user profile by using the user preference information, the user profile including a keyword and a point applied with a weight given per keyword; determining a ranking of the content set according to the relation to the user preference information including the user profile; and providing the ranked content set to the apparatus.

BRIEF DESCRIPTION OF THE DRAWINGS

These and other features, aspects and advantages of the present invention will become better understood with regard to the following description, appended Claims and accompanying drawings where:

FIG. 3 illustrates a webpage including a hyperlink in accordance with an embodiment of the present invention;

FIG. 4 illustrates the HTML source of a webpage in accordance with an embodiment of the present invention;

FIG. 5 is a mapping table created by extracting anchor tag information from an HTML source of a webpage in accordance with an embodiment of the present invention;

FIG. 7 is a user profile showing the rankings of keywords determined by using a weight computing method in accordance with an embodiment of the present invention;

DESCRIPTION OF THE EMBODIMENTS

Figure 1:
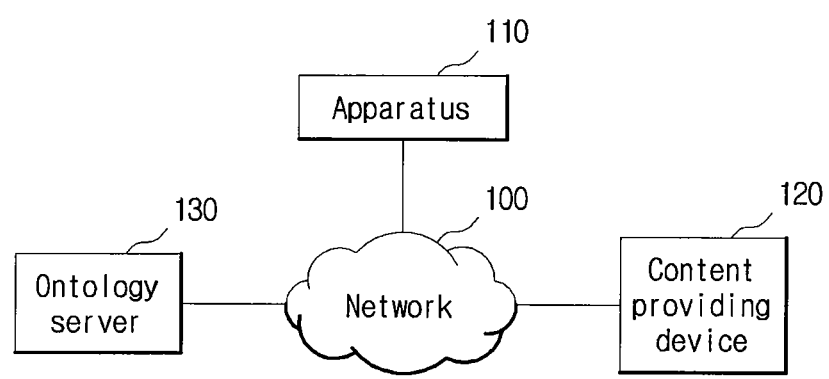
FIG. 1 is a simplified diagram illustrating the general system for providing user-customized contents in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

FIG. 1 is a simplified diagram illustrating the general system for providing user-customized contents in accordance with an embodiment of the present invention.

Referring to FIG. 1, the user-customized content providing system can be configured to include a network 100, an apparatus 110, a content providing device 120 and an ontology server 130.

The network 100 can be the wire or wireless communication network which connects the apparatus 110, the content providing device 120 and the ontology server 130. Communicating data between the apparatus 110, the content providing device 120 and the ontology server 130 can be performed by a predetermined communication protocol. It is not necessary that the network 100 connecting each element is one network.

The network 100 can be also configured in a form of local area network (LAN) or wide area network (WAN) by an asymmetric digital subscriber line (ADSL), a very high-data rate digital subscriber line (VDSL), a wireless-fidelity (Wi-Fi), a wireless broadband (WIBRO) and a high speed downlink packet access (HSDPA) and a virtual private network (VPN).

The content providing device 120 can customize contents for a user and rank the user-customized contents in order to provide ranked contents to user's apparatus 110. In accordance with an embodiment of the present invention, the content providing device 120 can be a typical web server providing the apparatus 110 with web documents such as webpages, some parts of the webpages and video.

In accordance with another embodiment of the present invention, the functions of the content providing device 120 can be performed by different devices. For example, the customization and ranking of contents can be performed by a web server, and a separate device can select the contents and provide the selected contents to the web server. Then, the web server can transmit the contents to user's apparatus.

Here, the "contents" can refer to the data having formats, capable of being indexed and searched by a search engine, such as webpages, video, multimedia files, text files and PDF files, for example. The term "contents" shall by no means restrict the scope of the present invention. The functions of the content providing device 120 will be described later in detail with reference to FIG. 2.

The apparatus 10 can be an information communication terminal having the same function as the network 100 such as desktop computers, PDA and mobile phones. Alternatively, the apparatus 110 can be realized as an electronic device capable of accessing the web-server 120 through the network 100.

In the embodiment of the present invention, the apparatus 110 can access the web-server 120 through the wire or wireless network 100 to be provided with contents such as a web document or can receive the service of deleting stop words from the ontology server 130.

The ontology server 130 can analyze the meaning of words detected from tag information included in the web document and delete stop words. The ontology can be considered as a kind of dictionary including words and their relations and can hierarchically represent words related to a certain domain.

Here, the stop words can refer to the postposition in Korean or the definite/indefinite word or the preposition in English, which are frequently used but are not independently used. For example, 와/과" or "을/를" in Korean or "a/an" or "the" in English can be classified as the stop words.

In accordance with another embodiment of the present invention, the apparatus 110 can delete the stop words. In particular, the apparatus 110 can filter necessary keywords by deleting unnecessary words from the tag information by use of the information (e.g. a stop word list) provided from the ontology server 130.

Figure 2:
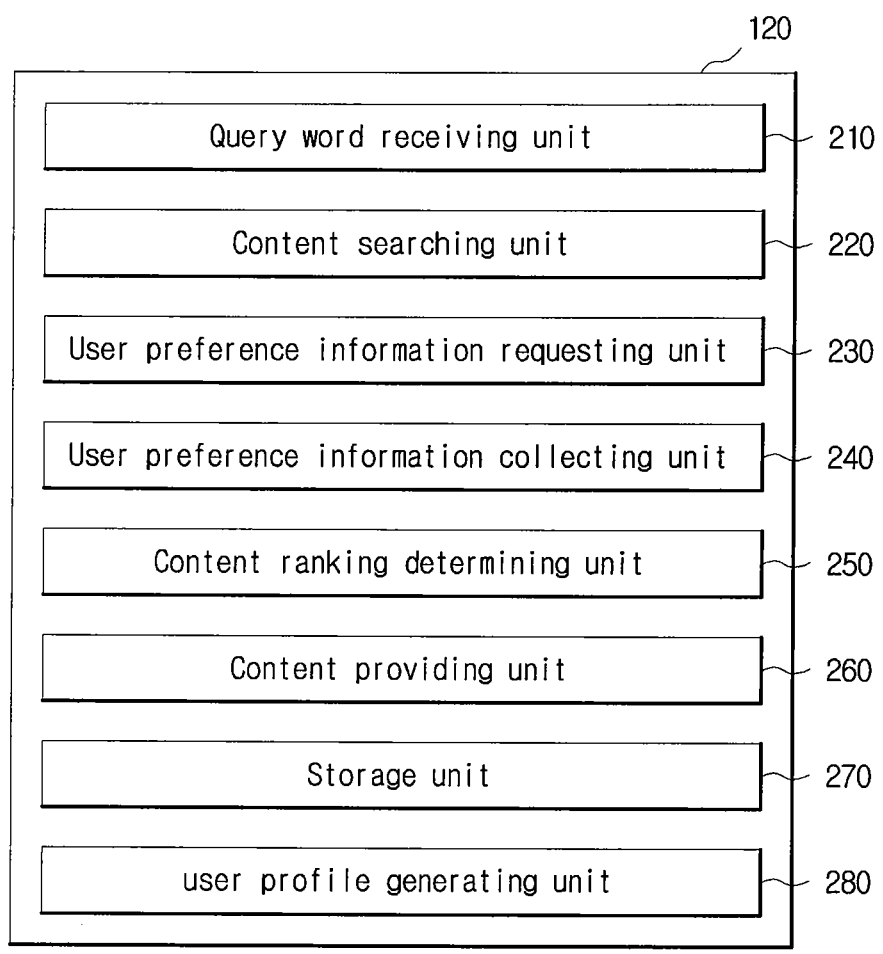
FIG. 2 illustrates the structure of a content providing device capable of providing user-customized contents in accordance with an embodiment of the present invention.

FIG. 2 illustrates the structure of a content providing device capable of providing user-customized contents in accordance with an embodiment of the present invention.

Referring to FIG. 2, in accordance with the embodiment of the present invention, the content providing device 120 can include a query word receiving unit 210, a content searching unit 220, a user preference information requesting unit 230, a user preference information collecting unit 240, a content ranking determining unit 250, a content providing unit 260, a storage unit 270 and a user profile generating unit 280.

The query word receiving unit 210 can receive and store a search query word that a user inputs into the apparatus 110 and transmits.

The content searching unit 220 can search the contents related to the search query word and show the searched content set as the searched result. After that, in accordance an embodiment of the present invention, the content set can be ranked based on the user preference information per user individually. Also, in accordance with another embodiment of the present invention, the search range of contents can be controlled based on the user preference information from the beginning, and the contents can be ranked according to the preference of each content.

If there is the user preference information collected in the apparatus 110, the user preference information requesting unit 230 can request the apparatus 110 to transmit the user preference information to the user preference information requesting unit 230.

The "user preference information" can be inclusive information related to subjects or fields in which a certain user is interested. In accordance with the embodiment of the present invention, the user preference information can include tag information, which is extracted from at least one tag of an anchor tag, form tag and a combination thereof, and a user profile, which is made by using the tag information.

Here, the "user profile" can be the data including not only the word applied with user's interest but also the point computed by giving a weight according to a predetermined standard per the word. At this time, user's interest can be applied to the point of the user profile. In other words, the point of the user profile can be the index showing the preference of words per user. Also, the point of the user profile can be considered to rank the content set.

Meanwhile, the user profile can be generated in the apparatus 110 and provided to the content providing device 120. If the content providing device 120 receives tag information only, the user profile generating unit 280 can generate the user profile based on the received tag information.

The user preference information collecting unit 240 can receive the user preference information that the apparatus 110 transmits according to the request of the content providing device 120 and store the received user preference information in the storage unit 270.

The content ranking determining unit 250 can determine the ranking of contents by applying personal interests based on the user preference information stored in the storage unit 270. The ranking of contents can be controlled according to the user preference information, for example, the relation to the word included in the user profile and the preference of each word.

The content providing unit 260 can provide the ranked content set. Each content of the content set can be displayed as the URL and the link to the desired page and include a part of the page text to show some of texts of the contents to a user. Also, the contents of the content set can be arranged in the upper part of a website in the descending order and be outputted to an output unit (not shown) of the apparatus 110.

The storage unit 270, which is a medium capable of all kinds of data by the process performed by the content providing device 120, can include a database. For example, the storage unit 270 can store user preference information and a query word received from the apparatus 110. In addition, the storage unit 270 can store the content set generated by using the user preference information.

As described above, the user profile generating unit 280 can generate a user profile by using tag information extracted from at least one tag of the anchor tag, the form tag and the combination thereof, received from the apparatus 110. The user profile can be created in various ways capable of helping to rank the content set corresponding to the user preference information. An example of the user profile will be described later in detail with reference to FIG. 3 through FIG. 7.

Hereinafter, the user preference information that is created by using the anchor tag and/or the form tag in accordance with an embodiment of the present invention will be described.

Figure 3:
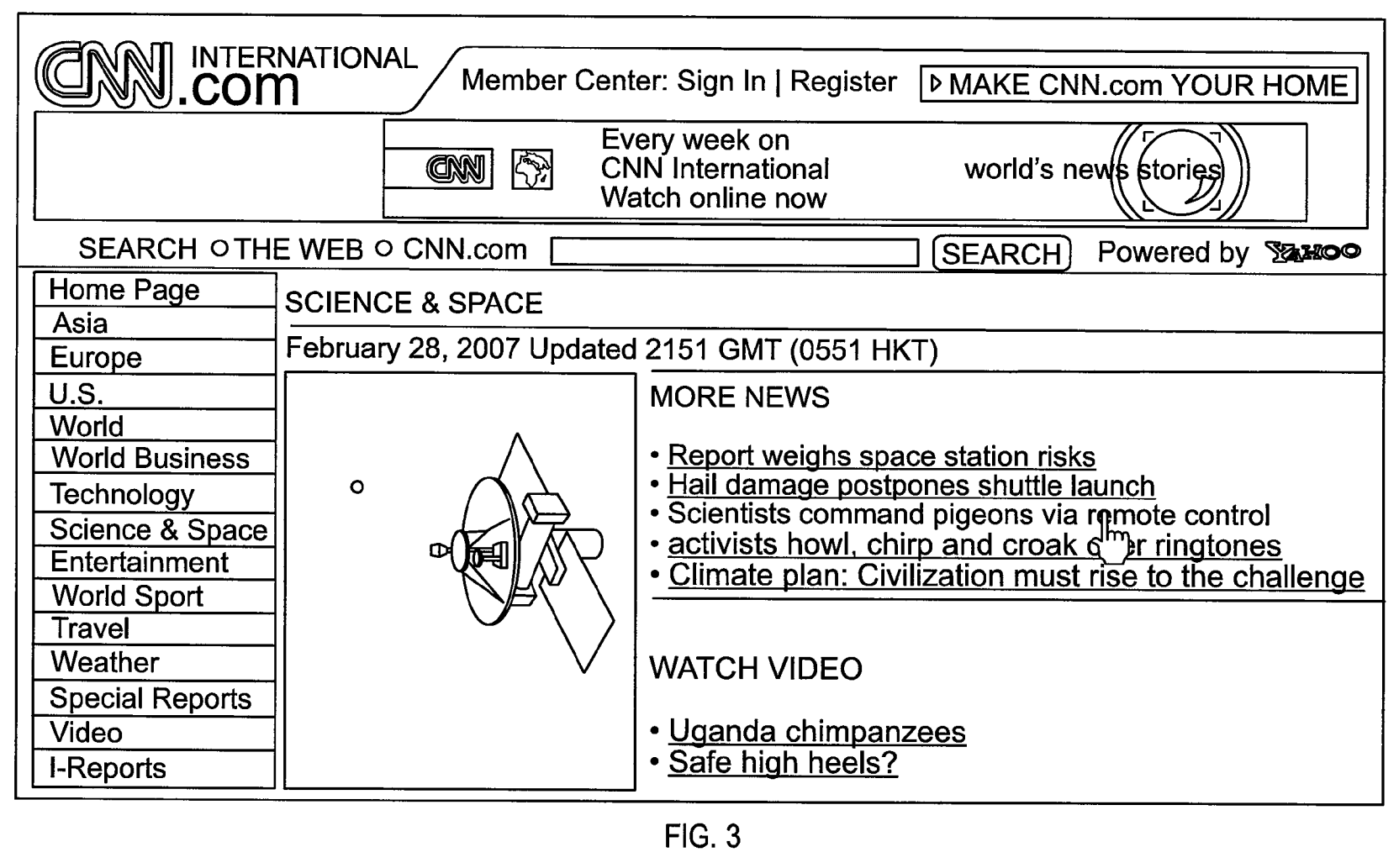

FIG. 3 illustrates a webpage including a hyperlink in accordance with an embodiment of the present invention, and FIG. 4 illustrates the HTML source of a webpage in accordance with an embodiment of the present invention. FIG. 5 is a mapping table created by extracting anchor tag information from an HTML source of a webpage in accordance with an embodiment of the present invention.

Referring to FIG. 3, the web document outputted in the apparatus 110 can be configured to include at least one hyperlink. As shown in FIG. 3, the hyperlinked text information can be the text information corresponding to the title of the web document accessed through the hyperlink. The hyperlink included in the web document, as illustrated in FIG. 4, can be included in an hypertext markup languish (HTML) source of the web document and be displayed. The anchor tag included in the HTML source of the web document can include the anchor text that is set as hyperlink title, representing the website having the following URL and the pertinent address.

<a href="URL">Anchor text</a>

Here, the anchor tag can refer to the tag generating a hyperlink among the HTML producing the hyper text. The hyperlink can be realized as graphic icons or text lines. A user can move to a web document connected to the hyperlink by clicking the mouse button. A web browser can mostly convert to the webpage designated as hyperlinks and display the webpage. Also, the hyperlink can download data and display a video.

The emphasized object can be called as an 'anchor.' The anchor can form a hypertext link. In the HTML, the anchor can declare sentences, images and all other information objects.

As an example of the sources shown in FIG. 4, in case that the anchor tag is <a href="/2007/WORLD/asiapct/02/27/china_pigeon.reut/index.html">Scientists command pigeons via remote control</a>, the hyperlink having the title of "Scientists command pigeons via remote control" can be generated. If a user clicks the hyperlink by using a mouse, the website corresponding to "/2007/WORLD/asiapct/02/27/china_pigeon.reut/index.html" can be connected.

FIG. 5 illustrates the mapping table created by extracting the tag information such as the anchor text corresponding to the URL and the hyperlink title connected to the URL and dividing the tag information per item.

The anchor tag information can include a uniform resource locator (URL) connected to the tag as information included in the anchor tag generating hyperlinks and an anchor text which is a text string of hypertext.

Referring to FIG. 5, the mapping table can be set to be divided into the URL and the anchor text corresponding to the hyperlink title. Then, the words of the anchor text can also undergo the operation of extracting only keywords by deleting stop words.

In other words, the apparatus 110 can write the tag information of overall part or some parts of the tags included in the outputted web document in the mapping table and recognize whether the URL of the web document to which the apparatus 110 moves next time is included in the mapping table. Accordingly, if the URL of the web document to which the apparatus 110 moves next time is included in the mapping table, the apparatus 110 can recognize the anchor text connected to the URL.

As such, the mapping table can be needed to identify the hyperlink of the web document that a user selects and moves to and to compute the weight of a word included in a user profile, and the load of the storage unit 270 can be reduced by temporally storing the hyperlink.

In accordance with another embodiment of the present invention, the keywords of the anchor text can be firstly extracted. Accordingly, the anchor text can consist of the keywords. In other words, the operation of detecting the keywords can be performed at any time after or before the mapping table is created.

Also, in accordance with another embodiment of the present invention, the mapping table can include form tag information as well as the anchor tag information. In other words, the apparatus 110 can write the tag information of the overall part or some parts of the tags included in the web document outputted to the apparatus 110 in the mapping table.

The form tag and the form tag information will be described below in detail with reference to FIG. 6.

Figure 6:
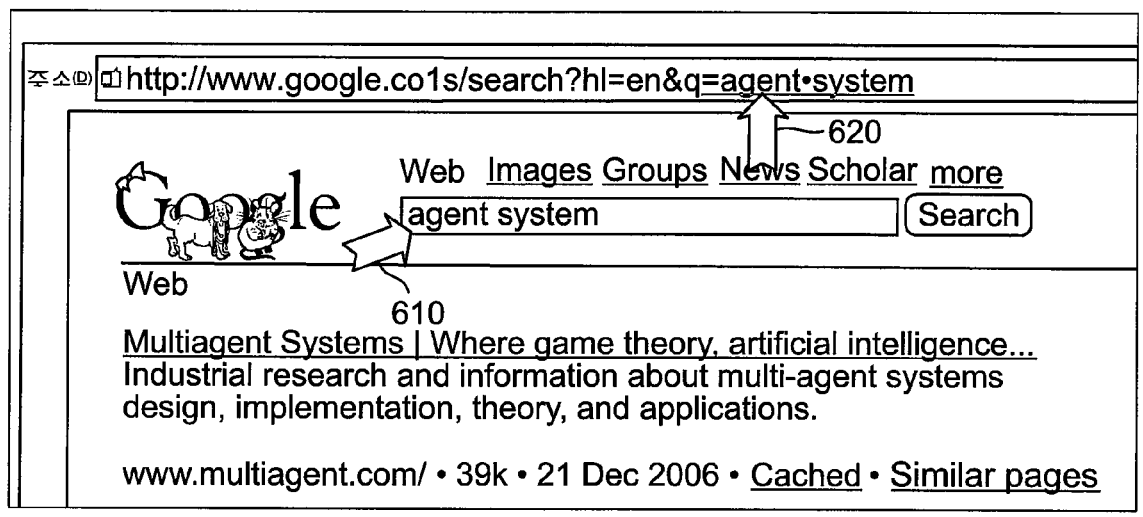
FIG. 6 illustrates a webpage including an address bar in which form tag information is displayed in accordance with an embodiment of the present invention.

FIG. 6 illustrates a webpage including an address bar in which form tag information is displayed in accordance with an embodiment of the present invention.

The form tag can receive data needed for web programming, such as ASP, PSP, and JSP, and transfer the data to the server. An input window, a password window and a check box can be created by using the form tag. In the embodiment of the present invention, the form tag information can be query information such as a text string which a user queries to a command processing unit (not shown) using the web programming language by using the apparatus 110.

There can be 'action' and 'method' as the attributes of the form tag. The 'action' can determine a destination to which the data received from the form tag is transmitted by designating the name of a file transferred from the form tag, and the method can determine the transferring method when the data is transferred to the destination determined by the 'action'. For example, in the case of <form action="abc.php" method="get/post">, the data in the form tag can be transferred to the abc.php by the method of the get/post.

The get/post, which is the tag designating the transferring method of data, can be considered as a method value. In accordance to the get method, an inputted parameter value can be seen in the address bar of a web browser. Unlike the get method, in accordance to the post method, a parameter value may not be seen in the address bar of the web browser.

FIG. 6 illustrates an example of the form tag, the 'method' of which is the get method. If the apparatus 110 inputs "agent system" as the query word into an input window 610 in order to search desired information in the search engine, the query word can be added to the back of the URL, to desired to be transferred, along with '?' and can be transferred. Here, the window into which the query word is inputted can correspond to the input tag used in the form tag.

If the URL of the web document to which a user moves next time is an address connected to the form tag, the apparatus 110 can extract user's query word added to the pertinent address from the address bar of the web document. Referring to FIG. 6, the apparatus 110 can extract the query words "agent" and "system" from the added word "agent*system" 620. The words extracted later can be determined whether to be keyword. If it is determined that the later-extracted word is the keyword, the word can be stored in the user profile.

In the meantime, in case that the apparatus 110 can transmit the query word by the post method, which is not shown, the query word can be added to the body of data and be transferred. Since the data to be transferred is inside, the data can be unseen from an outside.

Accordingly, in accordance with an embodiment of the present invention, in case that the query word is transmitted by the post method, the apparatus 110 is unable to immediately extract the query word. In this case, the apparatus 110, however, can ask the query word to the content providing device 120 and receive a corresponding response to recognize the query word.

Meanwhile, if a plurality of form tags is included in the web document displayed on the liquid crystal screen of the apparatus 110, the mapping table of the form tag information can be created like the anchor tag.

In other words, the query word and URL information connected to the query word as well as the anchor tag can be stored in order to recognize which form tag of the plurality of form tags the apparatus moves through.

FIG. 7 is a user profile showing the rankings of keywords determined by using a weight computing method in accordance with an embodiment of the present invention.

The present invention aims to generate a personalized user profile per apparatus 110 and to provide preference information per user based on the generated user profile. In particular, if user interest levels are numerically expressed by giving weights to each word extracted from the tag information by the apparatus 110 and their rankings are indexed according to the numerically expressed user interest levels, more accurate user preference information can be provided.

Referring to FIG. 7 the user profile can consist of the combinations of points computed by using the words extracted from the tag information and their weights. Giving weights to each word and ranking the words can be performed in various ways by a user.

For example, the high frequency in use of a word can mean that a user clicks the word many times by using a mouse. As a result, it can be said that the word has high interest of the user and is more useful. Reversely, the low frequency in use of the word can mean that the word has low interest of the user and is less useful. Accordingly, the word having the high frequency can have a higher point and ranking than the words having the low frequency by giving weights to the words having the high frequency.

Also, some words of the hyperlinks may be not clicked by a user although since the words are tag information that was included in the web document outputted to the apparatus 110, the words are included in the mapping table. At this time, the apparatus 110 can reduce the weights of the words considering that the user recognizes the words but does not select the words.

For example, if the word used one time in the user profile is assumed to be given to zero point, the apparatus 110 can add +K points into the word every time when the frequency in use of the word is increased by one time. Reversely, the apparatus 110 can add −L points into the words, which are not included in a hyperlink title connected to the URL selected and moved by a user although since the words are written in the web document displayed to the apparatus 110, the words are included in the mapping table.

In this case, the point of one word can be computed by the following formula.

$$Point=(a \times K)-(b \times L)$$

Here, 'a' refers to how many a certain word is clicked, and 'b' refers to how many a certain word is not clicked although the certain word is included in the mapping table. Also, the words selected by a user can have more weights by allowing the K to be the same as or larger than the L.

In accordance with another embodiment of the present invention, it is considered that the increased frequency in use of a word selected by a user indicates very large interest levels of the user. Accordingly, the weights can be computed to allow the points to be exponentially increased according to the frequency.

$$Point=K^a-(b \times L)$$

Here, 'a' and 'b' can be the same as described above.

In accordance with another embodiment of the present invention, the apparatus 110 can dynamically apply the change of user's preference by reducing the weight of the words included in the URL which is included in the user profile and the mapping table but is not selected by the user.

In accordance with another embodiment of the present invention, the points and rankings can be computed in proportion to the frequency in use of the words.

Also, referring to FIG. 7, the words having the $1^{st}$ through $N^{th}$ rankings, N being a natural number, can be included in the user profile. In other words, the number of the words included in the user profile can be determined as necessary by a user or a developer, and the words having the ranking that is lower than a threshold value can be deleted in the user profile.

For example, in case that the user profile ranking is re-adjusted in real-time, if the number of the words is limited to n, n words can be included in the user profile unit 730 in the descending order, for example. Here, n is a natural number. In this case, the words, the user profile ranking of which is lower than $n^{th}$, can be deleted, and the words, the user profile ranking of which is the same as or higher than $n^{th}$, can be included in the user profile.

At this time, the words deleted in the user profile may not be deleted in the storage unit 270 and can be still used to compute the frequency in use of words. For example, in the case of 10 words that is managed in the user profile, since the frequency in use of the words which are not in the 10<sup>th</sup> ranking has been continuously counted, if the words are included in the ranking of 10<sup>th</sup> later, the words can be included in the user profile.

The present invention can accurately provide a recent user interest field by analyzing user preference information in real-time and applying the analyzed information to re-adjust the rankings. Also, the road of the storage unit 270 can be reduced by limiting the number of the words stored in the user profile.

Figure 8:
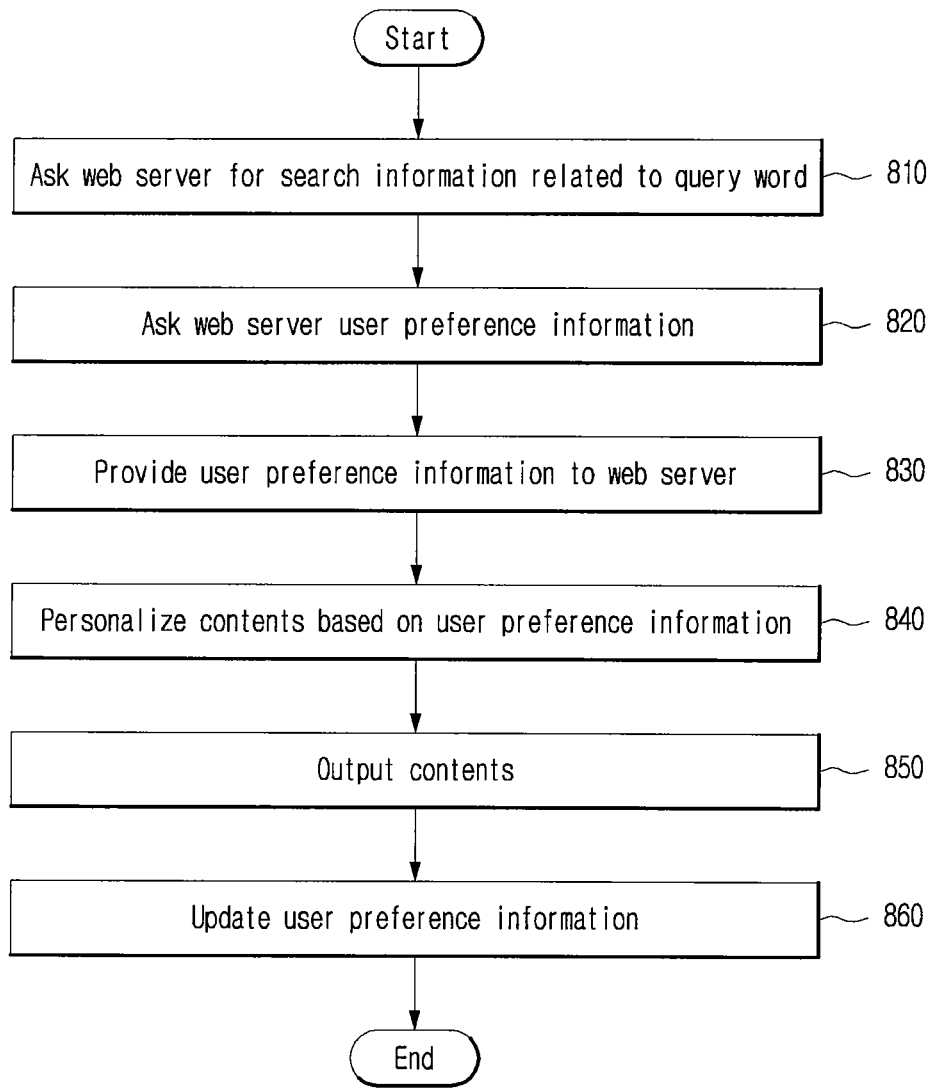
FIG. 8 is a flowchart illustrating the method of allowing a content providing device to receive user preference information from user's apparatus in accordance with an embodiment of the present invention.

FIG. 8 is a flowchart illustrating the method of allowing a content providing device 120 to receive user preference information from user's apparatus 110 in accordance with an embodiment of the present invention.

Referring to FIG. 8, in a step represented by 810, the apparatus 110 can ask the content providing device 120 for search information related to a query word inputted by a user. Then, in a step represented by 820, the content providing device 120 can ask the apparatus 110 for user preference information before providing the contents related to the search-requested query word.

If there is user preference information in the apparatus 110, the apparatus 110 can transmit the built-in user preference information to the content providing device 120 in a step represented by 830. Here, the user preference information that the apparatus 110 is about to transmit can be a user profile. In this case, the content providing device 120 can go to a step represented by 840.

However, if the user preference information transmitted by the apparatus 110 is the tag information extracted from at least one tag of the anchor tag, the form tag and the combination thereof, the method of allowing the content providing device 120 to receive user preference information from the apparatus 110 can further generating a user profile based on the extracted tag information.

In a step represented by 840, the content providing device 120 can personalize contents to be provided based on the user preference information (or pre-acquired user preference information) transmitted by the apparatus 110 and transmit the personalized contents to the apparatus 110. Here, personalizing the contents can be performed by determining the rankings of a lot of contents related to the search-requested query word to correspond to the user preference information in order to firstly provide the information in which users are most interested to each of the users. For example, when the result searched corresponding to the search keywords inputted by a user is provided to the apparatus 110, the items of the searched result corresponding to the user preference information can be firstly displayed.

In the case of personalizing the contents by using the pre-acquired user preference information, the content providing device 120 can use an MAC address of user's apparatus 110, an ID and/or a password, provided during user authentication, in order to use the user preference information corresponding to the pertinent user. In addition, a variety of available information can be used to identify a user.

In a step represented by 850, the apparatus 110 can output the contents transmitted from the content providing device 120 to an output unit (e.g. a liquid crystal screen). Then, the apparatus 110 can update the user preference information by monitoring user's action in a step represented by 860. For example, as described above, the user profile can be updated in real-time by applying the movement of user's web documents.

If there is no user preference information in the apparatus 110, the content providing device 120 can provide typical contents related to the search-requested query word to the apparatus 110.

Hereinafter, the process of extracting user preference information by the apparatus 110 will be described in detail.

Figure 9:
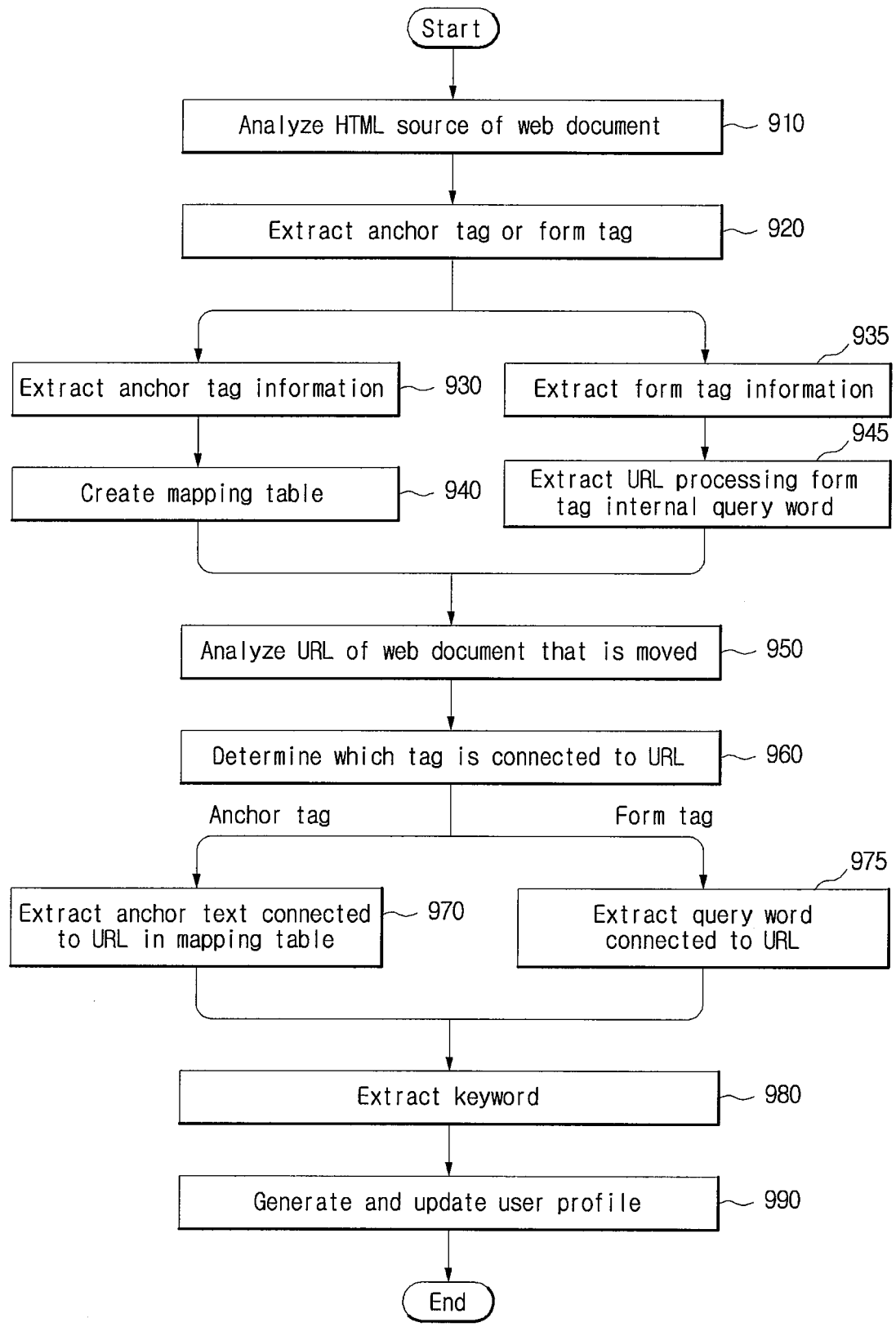
FIG. 9 is a flowchart illustrating the method of providing user preference information by user's apparatus in accordance with an embodiment of the present invention.

FIG. 9 is a flowchart illustrating the method of providing user preference information by user's apparatus in accordance with an embodiment of the present invention.

In a step represented by 910, the apparatus 110 can analyze the HTML source of a web document outputted to an output unit of the apparatus 110. In a step presented by 920, the apparatus 110 can search an anchor tag and/or a form tag among the HTML source analyzed in the step represented by 910 in order to extract the searched tag.

Further, the apparatus 110 can recognize whether the extracted tag is the anchor tag or the form tag in the step represented by 920. If the extracted tag is the anchor tag, the apparatus 110 can extract the anchor tag information in a step represented by 930.

The anchor tag information can include an URL connected to the anchor tag and/or an anchor text which is a hypertext string. Then, the apparatus 110 can create a mapping table by using the extracted URL and anchor text in a step represented by 940

If the tag extracted in the step represented by 920 is the form tag, the apparatus 110 can extract form tag information in a step represented by 935. Then, the apparatus 110 can extract an URL processing a form tag internal query word in a step represented by 945.

In a step represented by 950, the apparatus 110 can analyze the URL of a web document that is moved next time. Then, the apparatus 110 can determine whether the URL of the moved web document is connected to the anchor tag or the form tag in a step represented by 960.

If it is determined that the URL is connected to the anchor tag, in a step represented by 970, the apparatus 110 can compare the URL with the URL included in the mapping table. If the URL is the same as the URL included in the mapping table, the apparatus 110 can extract and analyze the anchor text which is the hyperlink title connected to the pertinent URL.

As the result determined in the step represented by 960, if the URL of the moved web document is connected to the form tag, the apparatus 110 can extract a query word connected to the pertinent URL in a step represented by 975.

In particular, if the query word is transmitted by the 'get' method, the apparatus 110 can extract the query word displayed in the address bar of a liquid crystal screen by itself. However, if the query word is transmitted by the 'post' method, the method of providing user preference information can further include requesting information related to the query word connected to the URL of the web document moved from the content providing device 120 and receiving the corresponding response.

Then, the apparatus 110 can delete unnecessary words in the extracted text information by using a stop word dictionary of the ontology server 130 in a step represented by 980. Accordingly, the keywords can be extracted from the anchor tag information.

In a step represented by 990, the apparatus 110 can generate a user profile by using the extracted keywords and update the generated user profile information. Here, the extracted keywords can be written along with the rankings applied with the frequency in use and/or the weights.

As described above, the method of the present invention embodying a program can be stored in a recorded medium, being readable by a computer, such as a CD-ROM, an RAM, an ROM, a hard disk and a magneto-optical disk.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalent.

What is claimed:

1. A user-customized content providing device including a processor configured to execute a plurality of computer programming units, the plurality of computer programming units comprising:
    a content searching unit, searching a content set related to user's search query word;
    a user preference information requesting unit, asking an apparatus for user preference information including a user profile and tag information through a network, the user profile including a keyword collected in the apparatus and a point applied with a weight given per keyword;
    a user preference information collecting unit, receiving the user preference information from the apparatus;
    a content ranking determining unit, determining a ranking of the content set according to the relation to the user preference information; and
    a content providing unit, providing the ranked content set to the apparatus,
    wherein the keyword is detected by using tag information extracted from at least one tag of an anchor tag, a form tag and a combination thereof that are included in a web document outputted to the apparatus, and wherein the point per keyword is calculated based on data related to a number of selections of the keyword by the user, selection of the keyword comprising clicking the anchor tag including the keyword.

2. The device of claim 1, wherein the keyword is detected by excluding a stop word from words included in a mapping table and query words, all parts or some parts of tag information included in the web document being written in the mapping table.

3. The device of claim 2, wherein the weight is subtracted for the keyword that is not selected by a user although the keyword is included in the mapping table or the user profile.

4. The device of claim 1, wherein the weight is added according to an increased frequency in use of the keyword.

5. The device of claim 1, wherein the keyword included in the user profile is ranked according to a point in accordance with the weight.

6. The device of claim 1, wherein keywords included in the user profile are limited to the Nth ranking, N being a natural number.

7. The device of claim 1, further comprising: a query word receiving unit, receiving the search query word from the apparatus.

8. A user-customized content providing device including a processor configured to execute a plurality of computer programming units, the plurality of computer programming units comprising:
    a content searching unit, searching a content set related to user's search query word;
    a user preference information requesting unit, asking an apparatus for user preference information including tag information extracted from at least one tag of an anchor tag, a form tag and a combination thereof through a network;
    a user preference information collecting unit, receiving the user preference information from the apparatus;
    a user profile generating unit, generating a user profile by using the user preference information, the user profile including a keyword and a point applied with a weight given per keyword;
    a content ranking determining unit, determining a ranking of the content set according to the relation to the user preference information including the user profile; and
    a content providing unit, providing the ranked content set to the apparatus, wherein the keyword is detected by using tag information extracted from at least one tag of an anchor tag, a form tag and a combination thereof that are included in a web document outputted to the apparatus, and wherein the point per keyword is calculated based on data related to a number of selections of the keyword by the user, selection of the keyword comprising clicking the anchor tag including the keyword.

9. A user-customized content providing method, comprising:
    searching a content set related to user's search query word;
    asking an apparatus for user preference information including a user profile and tag information, the user profile including a keyword collected in the apparatus and a point applied with a weight given per keyword;
    receiving the user preference information from the apparatus;
    determining a ranking of the content set according to the relation to the user preference information; and
    providing the ranked content set to the apparatus,
    wherein the keyword is detected by using tag information extracted from at least one tag of an anchor tag, a form tag and a combination thereof that are included in a web document outputted to the apparatus, and wherein the point per keyword is calculated based on data related to a number of selections of the keyword by the user, selection of the keyword comprising clicking the anchor tag including the keyword.

10. The method of claim 9, wherein the keyword is detected by extracting a stop word from words included in a mapping table and query words, all parts or some parts of tag information included in the web document being written in the mapping table.

11. The method of claim 10, wherein the weight is subtracted for the keyword that is not selected by a user although the keyword is included in the mapping table or the user profile.

12. The method of claim 9, wherein the weight is added according to an increased frequency in use of the keyword.

13. The method of claim 9, wherein the keyword included in the user profile is ranked according to a point in accordance with the weight.

14. The method of claim 9, wherein keywords included in the user profile are limited to the Nth ranking, N being a natural number.

15. A user-customized content providing method, comprising:
    searching a content set related to user's search query word;
    asking an apparatus for user preference information including tag information extracted from at least one tag of an anchor tag, a form tag and a combination thereof through a network;
    receiving the user preference information from the apparatus;
    generating a user profile by using the user preference information, the user profile including a keyword and a point applied with a weight given per keyword;

determining a ranking of the content set according to the relation to the user preference information including the user profile; and providing the ranked content set to the apparatus, wherein the keyword is detected by using tag information extracted from at least one tag of an anchor tag, a form tag and a combination thereof that are included in a web document outputted to the apparatus, and wherein the point per keyword is calculated based on data related to a number of selections of the keyword by the user, selection of the keyword comprising clicking the anchor tag including the keyword.

16. A recorded medium tangibly embodying a program of instructions executable by a device to providing user-customized contents, the recorded medium being readable by the device, the program comprising:

searching a content set related to user's search query word;

asking an apparatus for user preference information including a user profile and tag information, the user profile including a keyword collected in the apparatus and a point applied with a weight given per keyword;

receiving the user preference information from the apparatus;

determining a ranking of the content set according to the relation to the user preference information; and providing the ranked content set to the apparatus, wherein the keyword is detected by using tag information extracted from at least one tag of an anchor tag, a form tag and a combination thereof that are included in a web document outputted to the apparatus, and wherein the point per keyword is calculated based on data related to a number of selections of the keyword by the user, selection of the keyword comprising clicking the anchor tag including the keyword.

17. A recorded medium tangibly embodying a program of instructions executable by a device to providing user-customized contents, the recorded medium being readable by the device, the program comprising:

searching a content set related to user's search query word;

asking for an apparatus user preference information including tag information extracted from at least one tag of an anchor tag, a form tag and a combination thereof through a network;

receiving the user preference information from the apparatus;

generating a user profile by using the user preference information, the user profile including a keyword and a point applied with a weight given per keyword;

determining a ranking of the content set according to the relation to the user preference information including the user profile; and providing the ranked content set to the apparatus, wherein the keyword is detected by using tag information extracted from at least one tag of an anchor tag, a form tag and a combination thereof that are included in a web document outputted to the apparatus, and wherein the point per keyword is calculated based on a data related to a number of selections of the keyword by the user, selection of the keyword comprising clicking the anchor tag including the keyword.

* * * * *